Feb. 21, 1939.    J. H. GETTIG    2,148,117
TUBE CHILLING APPARATUS
Filed Oct. 6, 1937
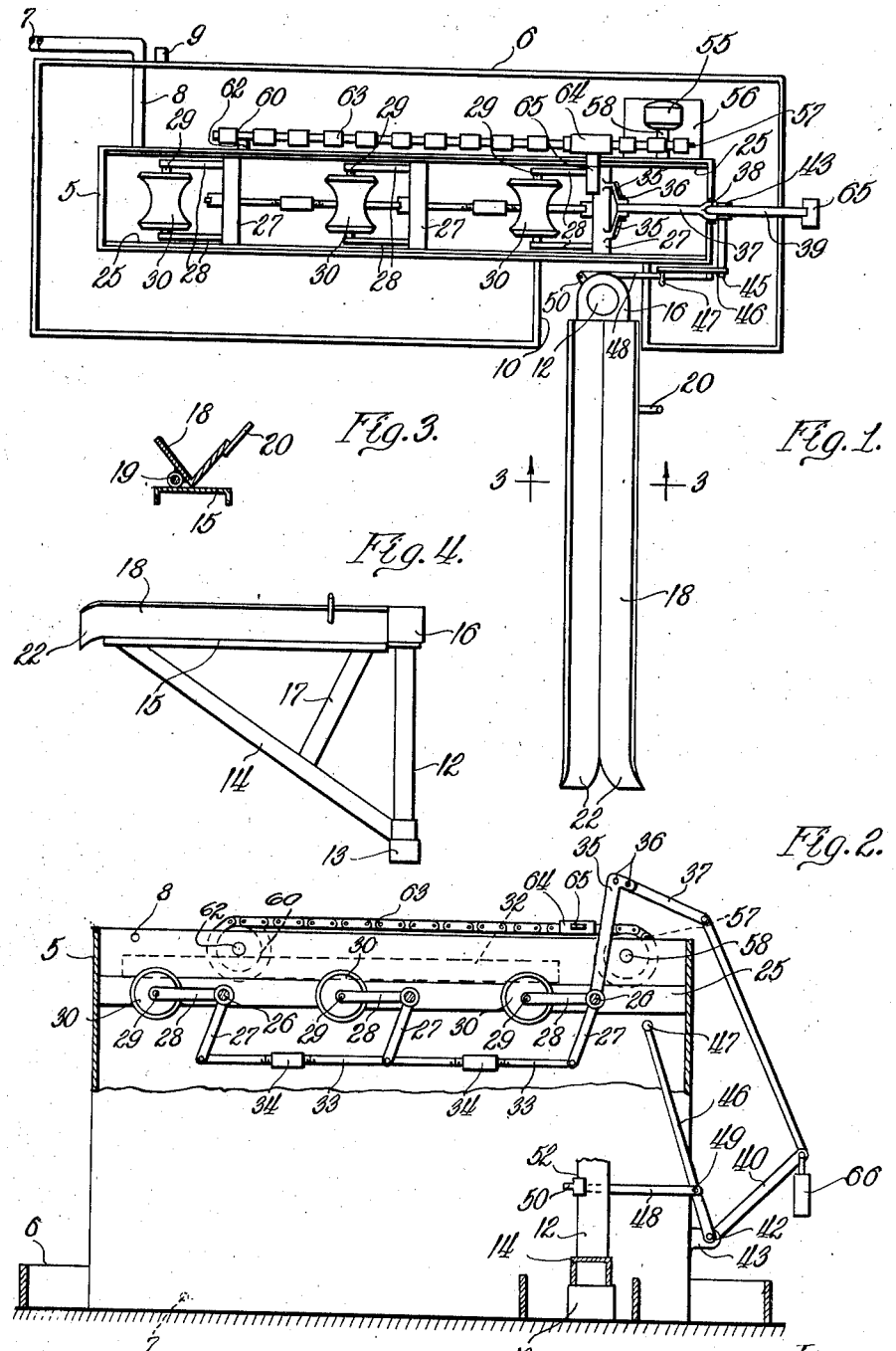
Inventor:
Joseph H. Gettig
By Walter E. Schirmer
Atty.

Patented Feb. 21, 1939

2,148,117

UNITED STATES PATENT OFFICE 2,148,117

TUBE CHILLING APPARATUS

Joseph H. Gettig, Buchanan, Mich., assignor to Clark Equipment Company, Buchanan, Mich., a corporation of Michigan Application October 6, 1937, Serial No. 167,581

8 Claims. (Cl. 266—6)

This invention relates to apparatus for chilling short lengths of tubular blanks as they leave a seam welding unit. The invention is particularly directed to apparatus which will receive the blanks from the welding unit and discharge such blanks to a chilling tank where they may be submerged in chilling liquid and thence drained and moved forward for subsequent operations thereon.

In its broader aspects the present invention consists of means for receiving the blanks as they are discharged by the pressure rolls of a seam welding unit, and for insuring that such blanks will be sufficiently cooled in a relatively short period of time so that they may be passed to succeeding operations and be handled without the use of automatic means. In this connection I prefer to employ a chilling tank in which the blanks can be entirely submerged to insure cooling of all portions of the blank regardless of the relative position of the welded seam as the tube is discharged into the tank.

One of the main objects of the present invention is to provide means which will support the tubes as they are moved into the tank and which is controllable to provide for lowering of the tubes to a submerged position, and subsequent raising of the tubes to a position such that the liquid in the interior thereof is quickly drained off and the tube is in position to be discharged endwise from the supporting means to the next step of operations.

Another feature of the present invention is the provision of means under direct control of the operator whereby one tube may be submerged and cooled while the second tube or blank is being received upon the discharge means so that upon movement of the second tube into position to be rolled into the tank the first tube is raised and drained and discharged from the tank in a substantially continuous operation.

In order to effect proper draining of the relatively short lengths of blanks I provide supporting means pivotally mounted in the tank and including roll members upon which the tube is carried as it is moved vertically down into the cooling liquid and then raised therefrom. This supporting means is adjustable so that the tube may lie thereon in somewhat an inclined position whereby as it is raised out of the cooling liquid it is automatically drained and substantially no liquid is carried over as the tube is rolled out of position above the tank.

Still another feature of the present invention is the provision of means for receiving the welded blanks from the welding unit, and chilling and draining the same without requiring the tubes to be manually touched by the operator, thus eliminating any possibility of burns or any other injuries due to possible handling of the tube.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is a top plan view of apparatus embodying the present invention;

Figure 2 is a side elevational view with certain portions broken away showing details of the tube supporting mechanism in the tank;

Figure 3 is a sectional view of the receiving means for the welded blanks taken substantially on line 3—3 of Figure 1; and Figure 4 is an elevational view of the receiving means.

Referring now in detail to the drawing, there is provided a chilling tank 5 which is preferably of elongated rectangular form and of considerable depth. The tank 5 is disposed substantially centrally within a surrounding trough or spill-over sump 6, which is adapted to catch any liquid spilling over the top of the tank 5 when the tube is submerged. Suitable means are provided adjacent the bottom of the tank such as indicated at 7 for introducing cooling liquid thereinto, and a suitable overflow connection 8 is provided adjacent the top of the tank whereby an outlet for the liquid is provided so that fresh cooling liquid may be continuously passed through the tank during the chilling operation. The sump 6 is also provided with a drain 9 leading to any suitable waste or recirculating line. Disposed at one side of the tank 5 and in a lateral recess 10 formed in the sump 6 is a vertically extending post 12 which is mounted for pivotal movement in a pedestal support 13. The post 12 is provided adjacent its lower end with a forwardly and upwardly extending channel-shaped member 14 which, at its forward and upper end, forms one support for a horizontal supporting member 15 which is connected at its opposite end to a suitable rotating collar 16 mounted at the upper end of the post 12. A cross brace member 17 is provided between the member 14 and the inner end of the member 15.

Mounted upon the member 15 and normally biased into the position shown in the Figures 1 and 3 is a V-shaped trough like member 18 which is provided adjacent one lateral face with hinge portions 19 whereby the member 18 may be rotated in a counterclockwise direction away from the supporting member 15 by means of a handle 20 projecting above the trough.

The forward end of the trough like member 18 is provided with a downwardly flared portion 22 which serves as a guide for guiding the forward end of the tubular blanks into the trough from the discharge means of a seam welding unit, such as the unit described in my copending application, Serial No. 163,192 filed September 10, 1937.

The tank 5 is provided adjacent its upper end with two longitudinally extending bars 25 secured to the inner surface thereof which form a support for the transversely extending shafts 26 pivotally mounted therebetween. Pivotally mounted on each of the shafts 26 is a bell crank arm member 27 having a pair of arm portions 28 which carry at their free ends a cross pin 29 upon which is rotatably mounted roll members 30. The roll members 30 are adapted to support a tubular blank such as the blank 32 shown in dotted lines in Figure 2, and are conjointly movable by reason of the connections 33 between the depending arm portions indicated at 27 in Figure 2. The connections 33 comprise link members having an adjustable coupling 34 threaded therebetween, whereby the relative angular position of the respective arms may be varied, as clearly shown in Figure 2, in which the arms are so adjusted that the tube is inclined slightly downwardly to the left when supported upon the rollers 30. The right hand arm 27 is also provided with an upwardly extending arm portion 35 comprising two forks which are adapted to carry therebetween at their free ends pins 36 which form a rigid connection for the link 37.

The link 37 is provided with a bifurcated end 38 to which is pivotally connected a second link 39 which extends downwardly beyond one end of the tank and is connected by the link 40 to the shaft 42 carried by a bracket 43 welded to the end of the tank adjacent its bottom. The shaft 42 has the link 40 connected thereto for conjoint rotation therewith, whereby rotation of the shaft will cause swinging movement of the link 40 thereabout. The shaft 42 extends laterally to one side of the tank as indicated at 45 in Figure 1, and a crank arm 46 is rigidly connected thereto to produce rotation of the shaft 42. It will be apparent that rotation of the shaft 42 in a clockwise direction will result in clockwise rotation of the arms 27 within the tank, and will thereby produce raising movement of the rollers 30 to raise the tube from a submerged position below the outlet 8 to a position above the upper edge of the tank. The shaft 42 may be rotated by means of a crank handle 47 secured to the upper end of the arm 46, or rotation of the shaft may be effected by rotating the post 12. This latter operation is secured by means of the link 48 pivotally connected at 49 to the crank 46, and pivotally connected at its opposite end to a laterally projecting arm 50 welded or otherwise secured to the post 12 as indicated at 52. Thus, if the operator pushes laterally to the left and downwardly upon the trough 18 to rotate the same, together with the post 12 upon the pedestal 13, the link 48 will be moved to the right as viewed in Figure 2, and will thus produce clockwise rotation of the shaft 42 for raising the rollers 30.

When the trough 18 is swung in a counterclockwise direction away from the position parallel with the tank 5, the shaft 42 will be rotated by the link 48 and the crank 46 in a counterclockwise direction thereby lowering the rollers 30 and consequently submerging the tubular blank 32 carried thereon.

In the operation of the apparatus the tubular blank is first received upon the trough 18 from the discharge means of the welding unit. The operator may then either pull the crank 47 to the right, or merely push upon the trough 18 which produces the same rotative movement of the crank, thereby raising the rollers 30 into a position to receive the blank. At the same time the trough 18 moves into a position parallel to the adjacent edge of the tank and at a level such that the member 15 is substantially the same height as the upper edge of the tank 5. The operator then discharges the tube onto the rollers 30 by grasping the handle 20 secured to the trough and rotating the same about the hinges 19. The tube rolls outwardly from the trough laterally onto the rollers 30 in position for submerging the same into the cooling liquid in the tank 5. Reverse movement of the trough and the post 12, or reverse movement of the crank 47 will result in the trough swinging into the position shown in Figure 1 where it can receive the next succeeding tube being discharged from the welding unit, and at the same time, produces lowering of the rollers 30 about the shafts 26 whereby the tube is moved into a submerged position as shown in Figure 2. Thus the tube is chilled during the period in which the trough 18 is receiving the next welded blank from the welding unit. When the next blank has been fully discharged onto the trough 18 the operation is repeated, whereby the trough is moved into a position parallel to the tank to discharge the blank laterally thereto and at the same time, the first blank is raised from its submerged position to a position just above the top of the tank. Due to the adjustments 34 between the arms 27, the tube is in an inclined position so that the cooling liquid within the interior thereof is quickly drained out of the tube as it is raised from its submerged position.

The operator then actuates any suitable control mechanism for starting the motor 55 mounted on a suitable base 56 secured to one side of the tank, which in turn actuates the sprocket wheel 57 mounted on the shaft 58 connected to the motor, and rotates the wheel in a counter clockwise direction as viewed in Figure 2.

Trained over the sprocket wheel 60 mounted upon a shaft 62 adjacent the opposite end of the tank is a chain member 63 which has secured thereto a block 64 provided with an arm 65 extending over the top of the tank, and in position to engage the rear end of the blank 32 when it is in raised position.

This actuation of the motor results in movement of the arm 65 lengthwise of the tank to discharge the tube outwardly of the left hand end of the tank 5 along the rollers 30 into position for the next succeeding operation. The motor is preferably one of the reversing type so that when the arm 65 has reached its limiting position at the discharge end of the tank it may be returned to the position shown in Figure 1. As the tube is discharged from the raised rollers 30, the operator rotates the trough 18 on the hinges 19 to thereby roll the next tube into position on the rollers.

The trough 18 is then swung back into the position shown in Figure 1 which results in submergence of the rollers 30 and the blank carried thereby, and positions the trough 18 for reception of the next succeeding tube.

It will thus be apparent that the mechanism herein disclosed is capable of producing simultaneous movement of the blank into position for discharge into the chilling tank, and raising of the preceding blank from its submerged position into position for discharge from the chilling operation to the next succeeding operation. Preferably, I provide a counterweight 66 for assisting in the raising movement in order to overcome the additional weight provided by the blank 32 resting on the rollers 30 when the mechanism is operated to raise the rollers. It is to be understood that the operator may either employ the crank 47 for producing the swinging movement of the trough and the rotating movement of the arms 27, or if desired, may manually push the trough from one of its positions to the other and thereby simultaneously actuate the arms 27.

It is believed obvious that the mechanism disclosed herein is simple in construction and operation and provides an efficient means for chilling the blanks as they come from the welding unit in order that they may be handled more readily in the succeeding operations.

I do not intend to be limited to the exact details of the mechanism herein shown and described, but only insofar as defined by the scope and spirit of the appended claims.

I claim:

1. In apparatus of the class described, a tank having a cooling liquid therein, blank supporting means mounted in said tank for vertical movement with respect to the surface of said liquid, charging means pivoted at one side of said tank and movable horizontally into and out of parallel alinement with one edge of said tank, and means for raising said blank supporting means upon movement of said charging means into said parallel position.

2. In apparatus of the class described, a tank of elongated rectangular form, a plurality of supporting rolls in said tank mounted for movement upwardly and downwardly therein, said rolls having their axes normal to the length of the tank and spaced apart longitudinally of the tank; a horizontally extending trough at one side of said tank mounted for pivotal movement into and out of parallel alinement with the upper longitudinal edge of said tank, and means common to all said rolls and said trough for raising said rolls as said trough swings into alinement and lowering said rolls as said trough swings out of alinement with said tank.

3. The combination of claim 2 further characterized in the provision of side rails in said tank having means extending therebetween forming pivots about which said rolls are raised and lowered, and adjustable connections in said raising and lowering means whereby said rolls are so disposed that the axes thereof lie in a plane inclined toward one end of said tank when in raised position.

4. In apparatus for chilling relatively short length tubular blanks, a receiving trough for receiving said blanks mounted for horizontal swinging movement, a chilling tank, said trough being movable into alinement with one longitudinal edge of said tank, means pivotally supporting said trough for lateral rotation toward said tank when in alined position, supporting means in said tank for receiving the blank from said trough, and means for raising and lowering said supporting means in said tank, said supporting means being so arranged that the blank lies in a horizontally inclined position thereon when said supporting means is in raised position.

5. In combination, a chilling tank of elongated rectangular form adapted to receive tubular blanks, means on one side of said tank for discharging said blanks laterally into the tank, pivotally mounted supporting means in said tank for raising and lowering the blanks in the tank, and means supported on the opposite side of said tank for moving said blanks longitudinally along said supporting means.

6. In combination, a tank of elongated rectangular shape having a plurality of bell cranks pivotally mounted in longitudinally spaced relation therein, supporting means for receiving a tubular blank discharged laterally into said tank disposed at one end of each bell crank, the opposite ends of each bell crank being connected together for conjoint movement whereby all of said supporting means are conjointly raised and lowered upon operation of one of said arms, means for rotating one of said arms including a crank pivotally supported on a wall of said tank, and means in the connections between said arms for varying the angular relation therebetween to provide for a vertical inclination of a blank disposed longitudinally on said supporting means.

7. In combination, a rectangular tank, supporting means therein spaced longitudinally of the tank having a common actuating connection for conjoint lowering and raising movement in said tank, means pivoted at one side of said tank for swinging movement into alinement longitudinally therewith to discharge tubular blanks laterally onto said supporting means, and means supported at the opposite side of said tank for moving said blanks longitudinally of said tank along said supporting means.

8. Means for receiving and chilling tubular blanks discharged from a seam welding unit comprising a horizontally extending frame pivotally supported at one end for horizontal swinging movement, a trough like member thereon, the base of said member being pivotally mounted on said frame for lateral rocking movement, a chilling tank disposed adjacent said end of said frame and having pivotally mounted supporting means therein adapted to receive said blanks from said member upon movement of said member into alinement with one side of said tank and lateral rocking thereof to roll said blank laterally onto said supporting means, means for lowering and raising said supporting means in said tank to chill said blank, and means on the opposite side of said tank engageable with one end of said blank when in raised position for discharging the chilled blank endwise from said tank.

JOSEPH H. GETTIG.